Feb. 27, 1934.　　　　　F. O. RIEK　　　　　1,948,676

VALVE

Filed Dec. 17, 1927

F. O. Riek
Inventor

By C. A. Snow & Co.
Attorneys.

Patented Feb. 27, 1934

1,948,676

UNITED STATES PATENT OFFICE 1,948,676

VALVE

Forest O. Rick, Rhinelander, Wis.

Application December 17, 1927
Serial No. 240,818

1 Claim. (Cl. 251—119)

This invention relates to a valve designed primarily for use in connection with compressors of the type forming a part of a domestic refrigerating unit.

One of the objects of the invention is to provide a simple and effective valve the parts of which can be readily assembled and do not require the use of springs, stems, separate centering means, or other structures tending to complicate and reduce the efficiency of the valve.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawing, the preferred forms of the invention have been shown.

In said drawing.

Figure 1:
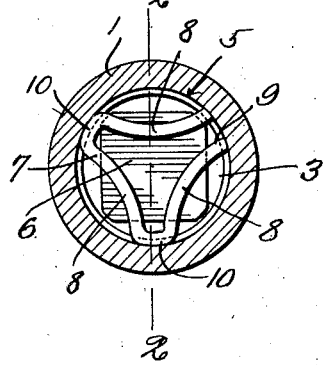
Figure 1 is a transverse section through the valve casing showing the valve and its retaining means in plan.

Referring to the figures by characters of reference 1 designates a portion of the valve casing having a passage 2 opening into a counterbore 3, there being an annular rib within the counterbore extending around the passage and constituting a valve seat. Formed in the wall of the counterbore 3 is an annular groove 5 rounded transversely as shown. The wall of the counterbore between the groove 5 and the seat 4 is smooth so as to be engaged slidably by the rounded corner portions of a substantially rectangular valve 6. This valve is formed of a very thin flat plate of steel adapted normally to rest on the seat 4, the rounded corner portions of the valve serving to hold the straight side edges spaced from the wall of the counterbore so that when the valve is unseated fluid can flow freely therearound.

Figure 2:
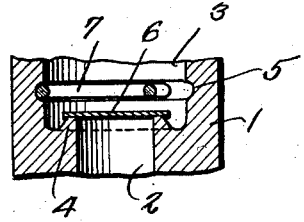
Figure 2 is a section on line 2—2, Figure 1.
Figure 3:
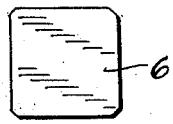
Figure 3 is a detail view of the valve.
Figure 6:
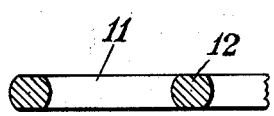
Figure 6 is an enlarged section through a portion of the retaining means shown in Figure 5.

For the purpose of retaining the valve in proper position relative to its seat a resilient spider 7 is seated detachably within the groove 5. This spider is formed preferably of spring steel and, in the structure illustrated in Figures 1 and 2, is shaped to provide three inwardly bowed side portions 8. Two of these side portions are spaced apart at one end as shown at 9 while the other ends of these side portions are joined to the other portion 8 by co..necting portions 10. These connecting portions as well as the free end portions of the spider are designed to seat firmly in the groove 5 but by contracting the sides where the ends 9 are normally spaced apart the entire spider can be contracted. Consequently by exerting a slight upward or downward pressure against the spider while thus contracted, the same can be caused to spring into or out of the groove. The opposed parallel faces of the spider are preferably slightly flattened so that the thickness of the spider is slightly less than the width of the groove 5 as will be seen by referring to Figures 2 and 6. Thus, the spider, when in its normal or expanded position, will bind tightly against the central portion of the wall of the groove 5 so that the spider cannot be unseated by pressure thereagainst. On the contrary the unseating of the spider can only be effected after said spider has been contracted as already explained.

With the spider in position the movement of the valve 6 is limited and while said valve will lift readily off of its seat, it will, when unseated, be held at all times properly positioned relative to its seat so as to promptly and accurately return thereto. As the valve 6 is of very thin steel it will snugly fit against its seat to prevent leakage but when it is unseated, undesirable buckling of the valve will be prevented because said valve will be backed by portions of the spider extending across that face thereof contacting therewith.

Figure 4:
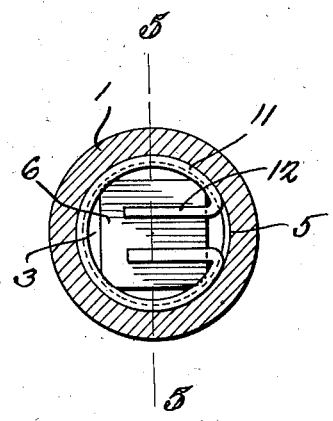
Figure 4 is a view similar to Figure 1 showing a slightly modified form of retaining means.
Figure 5:
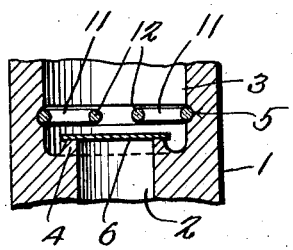
Figure 5 is a section on line 5—5, Figure 4.

Instead of using a spider of the type illustrated in Figure 1, a modified form such as illustrated in Figures 4 and 5 may be used. This spider is in the form of a ring 11 split at one side where it merges into parallel fingers 12 extending inwardly partly across the ring. In other respects the spider is of the same construction as the one already described. That is to say it has the slightly flat faces whereby only the outer marginal portion of the ring will press against the wall of the groove in which the spider is seated. By springing the fingers 12 toward each other the spider can be contracted efficiently to enable it to be forced into or pulled out of the groove 5. When the valve is unseated the fingers 12 will constitute efficient backing means therefor to prevent objectionable buckling or distortion of the valve.

What is claimed is:

The combination with a valve casing having a passage therein and a counterbore at one end of the passage, there being an annular seat at said end of the passage and within the counterbore and an annular groove within the wall of the counterbore, of a relatively thin resilient metal plate normally engaging the seat and constituting a valve, said plate having corner portions for sliding engagement with the wall of the counterbore, thereby to hold the sides of the valve spaced from the wall of the counterbore, and a contractable resilient retaining element bridging the counterbore and normally seated in the groove, said element constituting a backing for the valve when unseated, the thickness of the retaining element being less than the width of the groove whereby said element, when seated in the groove, is held spaced from the marginal portions of the wall of the groove but in clamping engagement with the intermediate or peripheral portion of the wall of the groove.

FOREST O. RIEK.